(12) United States Patent  (10) Patent No.: US 7,722,280 B2
Hofmann  (45) Date of Patent: May 25, 2010

(54) HOLLOW BODY COMPONENT

(75) Inventor: Peter Hofmann, Gauting (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 264 days.

(21) Appl. No.: 11/574,776

(22) PCT Filed: Sep. 5, 2005

(86) PCT No.: PCT/DE2005/001548
§ 371 (c)(1), (2), (4) Date: Mar. 6, 2007

(87) PCT Pub. No.: WO2006/026963
PCT Pub. Date: Mar. 16, 2006

(65) Prior Publication Data
US 2008/0213037 A1   Sep. 4, 2008

(30) Foreign Application Priority Data
Sep. 7, 2004   (DE) ........................ 10 2004 043 658

(51) Int. Cl.
*F16B 11/00* (2006.01)
(52) U.S. Cl. ........................ 403/266; 403/267; 403/271; 403/344; 403/364; 296/205; 280/124.116; 280/797
(58) Field of Classification Search ................ 403/266, 403/267, 270, 271, 364, 344; 280/797, 124.11, 280/124.116, 124.128, 124.134; 228/3.1, 228/115; 296/29, 204, 205, 193.06
See application file for complete search history.

(56) References Cited

U.S. PATENT DOCUMENTS

| 4,567,014 A * | 1/1986 | Popp et al. .................... 376/272 |
| 5,261,749 A * | 11/1993 | Bennett et al. .............. 384/276 |
| 5,271,687 A | 12/1993 | Holka et al. |
| 5,348,210 A * | 9/1994 | Linzell ........................ 228/115 |
| 5,695,213 A * | 12/1997 | Nakamura et al. ..... 280/124.134 |
| 5,716,155 A | 2/1998 | Yoshida et al. |
| 5,909,888 A | 6/1999 | Betz et al. |
| 6,007,058 A * | 12/1999 | Kokubo et al. .............. 403/344 |
| 6,217,251 B1 * | 4/2001 | Kato et al. .................. 403/364 |
| 6,352,385 B1 * | 3/2002 | Wojciechowski et al. ... 403/364 |
| 6,548,792 B1 * | 4/2003 | Durand ........................ 228/115 |

FOREIGN PATENT DOCUMENTS

| DE | 295 01 701.5 | 5/1995 |
| JP | 10-181640 | 7/1998 |

* cited by examiner

*Primary Examiner*—Michael P Ferguson
(74) *Attorney, Agent, or Firm*—McGlew and Tuttle, P.C.

(57) ABSTRACT

A hollow-bodied component, which includes at least two die-cast shell elements (1, 2), is suitable in particular for use as a steering component in motor vehicle running-gear assemblies. The hollow-bodied component has a connection zone (5, 6, 18, 19) configured on the shell elements (1, 2) to be interconnected. One connection zone (5) has one first contact area (7) with an essentially U-shaped cross-section that is located on the respective shell element (1) and the other connection zone has at least one strut-type second contact area (8) that engages in the space in the U-shaped first contact area (7) and that is located on the respective other shell element (2). The connection zones (5, 6, 18, 19) are joined in a force fit in a cold welding process that uses a contact pressure ($F_1$, $F_2$), whose value is a multiple of the separating force components ($F_r$) that act on the connection zones (5, 6, 18, 19) during operation. A method is provided for producing the component.

20 Claims, 2 Drawing Sheets

HOLLOW BODY COMPONENT

CROSS REFERENCE TO RELATED APPLICATIONS

This application is a United States National Phase application of International Application PCT/DE2005/001548 and claims the benefit of priority under 35 U.S.C. §119 of German Patent Application DE 10 2004 043 658.4 filed Sep. 7, 2004, the entire contents of which are incorporated herein by reference.

FIELD OF THE INVENTION

The present invention pertains to a hollow body component, especially for use as a control arm component in motor vehicle chassis assembly units as well as to a process for manufacturing such a hollow body component.

BACKGROUND OF THE INVENTION

The style of such hollow body components as well as the process for manufacturing same are characterized in the state of the art by the fact that the shell elements used for the hollow body components are connected to one another, as a rule, by positive-locking connections, for example, screw connections, riveting, rolling or beading. These types of connection technique arise from the fact that the diecast material generally used for the shell elements, for example, diecast aluminum, PROAL diecast material or VACURAL diecast material, cannot, as a rule, be welded. Due to the possible manufacture of solid and yet thin-walled components, diecast material and especially diecast aluminum is of rather substantial significance especially in automotive engineering.

However, the connection technique based on the above-mentioned positive-locking connections requires, as a rule, a rather substantial manufacturing effort, which makes industrial-scale manufacture appear to be often uneconomical from the viewpoint of the costs.

SUMMARY OF THE INVENTION

The object of the present invention in reference to the hollow body component is therefore to perfect such components such that they can be manufactured at a low cost and nevertheless meet all the requirements imposed on such components in usual operating situations.

With respect to the process according to the present invention, the object is to provide a novel connection technique for such hollow body components.

According to the invention, a hollow body component is provided to be subjected to operation forces (e.g., a maximum force rating or operating force range) having a separating force component acting on the hollow body (the force component of the operating forces acting to separate elements of the hollow body component). The hollow body component comprises a first shell element made of diecast material, with the first shell element having a first shell element connection area, and a second shell element made of diecast material, with the second shell element having a second shell element connection area. The first shell element connection area comprises a first contact area having an essentially U-shaped cross section and the second shell element connection area comprises a web-like second contact area which engages into a space of said U-shaped first contact area. The first shell element connection area is cold-welded to the second shell element connection in a non-positive manner by applying a pressing force which is several times stronger than the separating force component.

It is essential for the present invention here that at least one connection area is formed on the shell elements to be connected, a connection area comprising at least one first contact area, which is arranged on the particular shell element and has an essentially U-shaped cross section, and the second connection area comprises at least one web-like second contact area, which meshes with the space of the U-shaped first contact area, on the respective other shell element, which are cold-welded to one another in a non-positive manner by the application of a pressing force, which is several times stronger than the separating force component acting on the connection areas in the operating state.

The special design of the connection areas in connection with the cold-welding procedure employed for the shell elements can be embodied by means of the modern casting technique and corresponding pressing devices without problems and at a low cost. The special inventive idea is, in particular, also that the cold welding of materials, which is undesirable in many areas, is brought about purposefully for the present invention and is thus used in a technologically useful manner.

The manufacture of the hollow body component comprising at least two shell elements manufactured by diecasting comprises two essential process steps, which consist of first providing the shell elements to be connected with at least one connection area each during the diecasting process, the connection areas comprising, on the one hand, a first contact area, which is arranged on one shell element and has an essentially U-shaped cross section, and, on the other hand, a web-like second contact area meshing with the space of the U-shaped contact area (engaging into or inserted into the space between side walls that form the U-shaped contact area) on the other shell element, and of applying a pressing force on the connection areas after the joining as an additional process step, the pressing force being several times stronger than the separating force components acting on the connection areas of the shell elements in the operating state.

The process steps being described form the basis of an inexpensive manufacturing process, in which the cold welding operation of materials is used, for the first time ever, for the useful connection of components.

It proved to be especially advantageous for the increased load-bearing capacity of the connection areas in the operating state if the pressing force is in the range corresponding to 6 to 10 times the separating force component, and the cross-sectional dimensions of the web-like second contact area of a shell element additionally form a press fit connection with the internal dimension of the space of the U-shaped first contact area on the other shell element in an additionally supportive manner.

Since a so-called mold release slope is necessary, especially in the U-shaped first contact area of one of the shell elements, due to the fact that the shell elements are manufactured according to the casting technique (casting), it should be ensured, when selecting this mold release slope, that the legs of the contact area, which are arranged essentially in parallel, be provided with a mold release slope of 0.5° to 3°. Cold welding can be guaranteed by this measure over the entire contact area of the shell elements to be joined together.

The cold welding of the shell elements is facilitated, moreover, by an additional roughening of the surfaces that will come into contact with one another, as a result of which stronger cohesive forces will develop at the same time.

Provisions are made in another expedient embodiment of the present invention for a connection area comprising two first contact areas, which are arranged at the respective shell element, have an essentially U-shaped cross section and are arranged next to each other, and for the other connection area comprising at least two web-like second contact areas meshing with the spaces of the two U-shaped first contact areas on the respective other shell element. The load-bearing capacity of the connection areas and thus of the overall construction increases due to this design embodiment.

In addition, it may be advantageous within the framework of the inventive idea if the shell elements to be connected are provided with at least one common positive-locking coupling device. Such a coupling device offers an additional safety aspect for the cases in which the connection areas to be connected to one another according to the present invention reach their limit concerning the absorption of forces as a consequence of extraordinarily strong separating force components on the shell components.

In an advantageous embodiment, the coupling device may comprise at least two junction areas, which are arranged on one of the shell elements to be connected each and have an essentially annular cross section, a plug-in element connecting the junction areas in a positive-locking manner being passed through the inner cavities of the annular openings of the junction areas.

The cross sections of the junction areas may have an annular shape, in which case the connecting plug-in element is correspondingly designed as a round bolt or as a bearing element.

Another advantageous embodiment of the coupling device provides for the connecting plug-in element to be designed as an outer ring of a bearing component if the cross sections of the junction areas are annular. Such bearing components are often necessary to connect the hollow body components to chassis-side or body-side connections in the motor vehicle, so that the necessary mounts can also be embodied in terms of design by means of the coupling device at the same time.

A hollow body component according to the present invention as well as the corresponding process for manufacturing same will be explained in more detail below on the basis of the attached drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
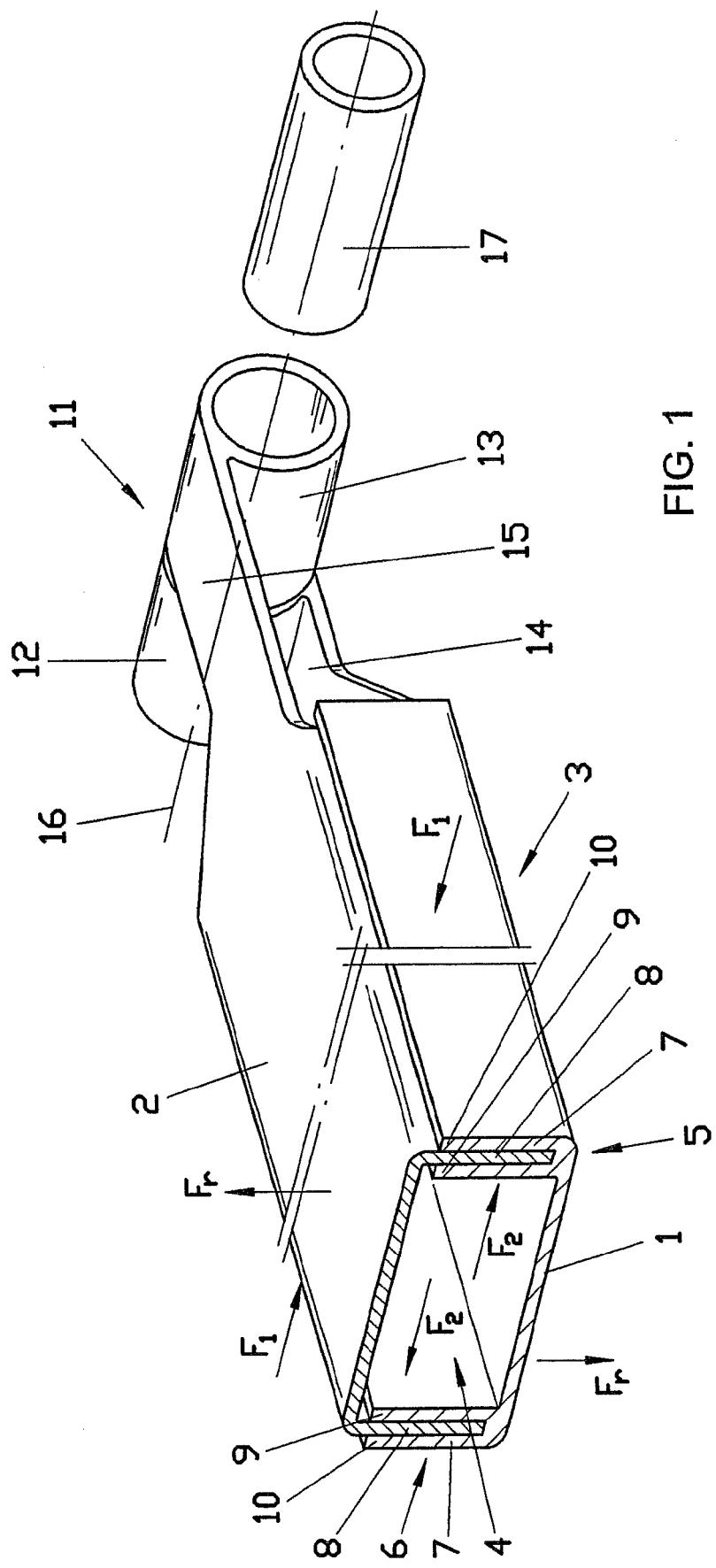
FIG. 1 is a partially cut-away perspective view of a hollow body component for use as a control arm component in motor vehicle chassis assembly units.

Referring to the drawings in particular, the hollow body component corresponding to FIG. 1, which is designated 3 in its entirety, comprises a first shell element 1 and a second shell element 2. The two shell elements 1, 2 enclose, in the assembled state, a cavity 4 having a rectangular cross section. The connection of the shell elements 1, 2 is performed on mutually opposite lateral surfaces of the rectangular cross section in the opposite connection areas 5 and 6, which extend along the shell elements 1, 2 and are pushed into each other. The connection areas 5 located on the shell element 1 comprise in the first exemplary embodiment essentially a contact area 7 having a U-shaped cross section and the connection areas 6 arranged on the second shell element 2 comprise essentially the web-like contact area 8.

The contact area 8 meshes with the space of the U-shaped contact area 7, so that the lateral surfaces of the contact area 8 come into contact with the inner surfaces of the two legs 9, 10 of the contact area 7.

The contact areas 7, 8 are formed on the respective shell elements 1, 2 in connection with the shaping of the shell elements by means of a diecasting process. The diecasting process offers an inexpensive possibility as a consequence of the narrow tolerances that can be obtained with this manufacturing process and guarantees, moreover, due to corresponding dimensioning specifications, that the cross-sectional dimensions of the web-like contact area 8 of the shell element 2 can form a press fit connection with the internal dimension of the space of the U-shaped contact area 7 on the shell element 1. In addition, different wall thicknesses can be embodied, depending on the load on the hollow body component.

After the end of the diecasting process, the shell elements 1 and 2 are fitted together to form the hollow body component 3. The further process step for connecting the shell elements 1, 2 comprises the application of a pressing force on the particular connection areas 5 and 6 plugged into each other corresponding to arrows $F_1$ and $F_2$ in FIG. 1 attached. The pressing forces $F_1$ and $F_2$ are selected to be such that they are in the range corresponding to 6 to 10 times a separating force component $F_r$, which acts on the connection areas 5 and 6 of the hollow body component 3 in the operating state corresponding to arrow $F_r$.

It may be advantageous for the strength of the connection between the shell elements 1 and 2 if the surfaces of the contact areas 7 and 8 that are in contact with one another are roughened before the fitting together.

In addition, the legs 9 and 10 of the contact area 7, which are arranged essentially in parallel, shall be manufactured with a mold release slope of 0.5° to 3°. A certain mold release slope is necessary for the manufacture of the U-shaped contact area 7 on the shell element. The mold release slope guarantees removal from the mold without problems, on the one hand, and, moreover, problem-free contact between the surfaces of the contact areas 7 and 8.

To meet even higher safety requirements imposed on the hollow body component being described, the hollow body component is provided, corresponding to an advantageous variant, with a coupling device, which is designated by 11 as a whole.

The coupling device 11 comprises a junction area 12, which is arranged at the shell element 1 and has an annular cross section, and a junction area 13, which is located on the shell element 2 and is likewise essentially annular. The annular areas 12 and 13 are connected to the shell elements 1 and 2 via respective webs 14 and 15. Both junction areas 12 and 13 are designed such that their respective central longitudinal axes form a common center line 16.

Moreover, a plug-in element 17, which is inserted into the cavities of the junction areas 12 and 13, forms a portion of the coupling device 11. The plug-in element 17 is designed in the attached view as an outer ring of a bearing component, by means of which the hollow body component 3 can be fixed to a body-side or chassis-side connection of a motor vehicle.

The coupling device 11 may, of course, also be designed with other cross sections if it is guaranteed that the corresponding plug-in element 17 connects the respective junction areas 12 and 13 of the corresponding shell elements 1 and 2 in a positive-locking manner.

Figure 2:
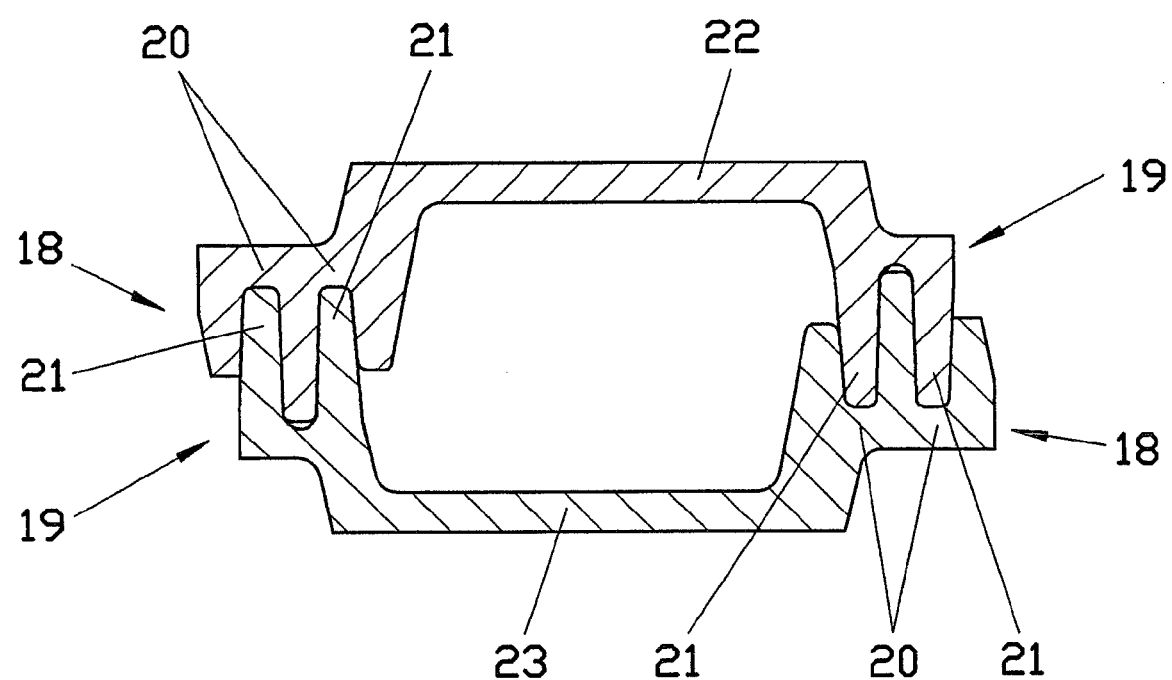
FIG. 2 is a cross-sectional view of an alternative cross-sectional shape of the component from FIG. 1.

The view in FIG. 2 shows an alternative cross section of a hollow body component according to the present invention. This component comprises two shell elements 22 and 23, which have connection areas 18 and 19 that are inserted into one another on opposite narrow sides.

The connection area 18 comprises according to this embodiment two first contact areas 20, which are arranged on the respective shell element 23, have an essentially U-shaped cross section and are arranged next to one another. The other connection area 19 comprises at least two web-like second contact areas 21, which mesh with the spaces of the two U-shaped first contact areas 20, on the respective other shell element 22.

The respective connection elements 18 and 19 are reversed on the opposite side of the shell elements.

While specific embodiments of the invention have been shown and described in detail to illustrate the application of the principles of the invention, it will be understood that the invention may be embodied otherwise without departing from such principles.

The invention claimed is:

1. A hollow body component to be subjected to operation forces having a separating force component acting on the hollow body, the hollow body component comprising:
   a first shell element made of diecast material, said first shell element having a first shell element connection area;
   a second shell element made of diecast material, said second shell element having a second shell element connection area, said first shell element connection area comprising a first contact area having an essentially U-shaped cross section, said second shell element connection area comprising a web-shaped second contact area, said web-shaped second contact area being inserted into and engaging a space of said U-shaped first contact area in a joining direction of said first shell element, said first shell element connection area being cold-welded to said second shell element connection area in a non-positive manner by applying a pressing force which is several times stronger than the separating force component, said first shell element and said second shell element being provided with a common, positive-locking coupling device comprising:
   a first junction area arranged on said first shell element and having a first central longitudinal axis;
   a second junction area arranged on said second shell element and having a second central longitudinal axis, said first central longitudinal axis being aligned with said second central longitudinal axis to form a common center line perpendicular to said joining direction, each of said first junction area and said second junction area having an essentially annular cross section to define essentially annular cavities, said essentially annular cavity of said first junction area being in communication with said essentially annular cavity of said second junction area to define a plug-in element receiving cavity; and
   a plug-in element comprising an outer ring of a bearing component, said plug-in element receiving cavity receiving said plug-in element such that said plug-in element connects said first junction area and said second junction area in a positive-locking manner, with said plug-in element passing through said essentially annular cavities.

2. A hollow body component in accordance with claim 1, wherein:
   said first shell element connection area comprises two opposing first contact areas arranged on said first shell element and having an essentially U-shaped cross section; and
   said second shell element connection area comprises at least two web-shaped, second contact areas, which respectively engage into spaces of said two U-shaped first contact areas.

3. A hollow body component in accordance with claim 1, wherein said pressing force applied is in the range of 6 to 10 times said separating force component.

4. A hollow body component in accordance with claim 1, wherein said web-shaped second contact area has cross-sectional dimensions to define a press fit connection with an internal dimension of said space of said U-shaped first contact area.

5. A hollow body component in accordance with claim 1, wherein said U-shaped first contact area has legs arranged essentially in parallel and having a mold release slope in the range of 0.5 to 3.

6. A hollow body component in accordance with claim 1, wherein said first contact area and said second contact area have surfaces that are roughened before said shell elements are joined together.

7. A hollow body component in accordance with claim 1, wherein said connection areas are formed circumferentially on said respective shell elements.

8. A hollow body component in accordance with claim 1, wherein said connecting plug-in element is embodied as a cylindrical plug-in element.

9. A hollow body component in accordance with claim 1, wherein said shell elements to be connected are manufactured from a diecast aluminum material.

10. A hollow body component in accordance with claim 1, wherein said first junction area and said second junction area are arranged one after another in a direction of said common center line.

11. A hollow body component in accordance with claim 10, wherein each junction area forms a closed ring.

12. A hollow body component in accordance with claim 1, wherein each junction area forms a closed ring.

13. A hollow body component in accordance with claim 12, wherein said first junction area and said second junction area are arranged one after another in a direction of said common center line.

14. A hollow body component in accordance with claim 1, wherein said web-shaped second contact area extends to a free end thereof in said joining direction.

15. A hollow body component in accordance with claim 1, wherein said first junction area is connected to said first shell element via a first web, said second junction area being connected to said second shell element via a second web.

16. A hollow body component in accordance with claim 15, wherein said first shell element and said second shell element define a hollow body component recess, said first web and said second web being located at a position outside of said hollow body component recess.

17. A hollow body component in accordance with claim 15, wherein said first web is located at a spaced location from said second web.

18. A hollow body component in accordance with claim 15, wherein said first web and said second web are of a flattened configuration.

19. A hollow body component in accordance with claim 1, wherein each of said connection areas is reversed on an opposite side of said first shell element and said second shell element.

20. A hollow body component to be subjected to operation forces having a separating force component acting on the hollow body, the hollow body component comprising:
 a first shell element made of diecast material, said first shell having
 a first shell inner surface, said first shell element having a first leg portion and a second leg portion extending from one side of said first shell inner surface, and a third leg portion and a fourth leg portion extending from an opposing side of said first shell inner surface, said first leg having a first leg inner surface, said second leg portion having a second leg outer surface and a second leg inner surface, said third leg portion having a third leg inner surface and a third leg outer surface, said fourth leg portion having a fourth leg inner surface, said first leg inner surface and said second leg inner surface defining a first receiving recess, said third leg inner surface and said fourth leg inner surface defining a second receiving recess;
 a second shell element made of diecast material, said second shell comprising a first projection portion and a second projection portion, said first projection portion being inserted into said first receiving recess and said second projecting portion being inserted into said second receiving recess in a joining direction of said first shell element, said second shell having a second shell inner surface extending between said first and second projecting portions, said first shell element being cold-welded to said second shell element in a non-positive manner by applying a pressing force which is several times stronger than the separating force component, said second leg outer surface, said first shell inner surface, said third leg outer surface and said second shell inner surface defining a cavity having an essentially rectangular cross section; and
 a plug-in element comprising an outer ring of a bearing component, wherein said first shell element has a first annular ring element and a first web, said first annular ring element being located at a spaced location from said first leg portion, said second leg portion, said third leg portion and said fourth leg portion, said first annular ring element having a first longitudinal axis and a first annular ring element inner surface, said first annular ring element inner surface defining a first ring cavity, said first annular ring element being connected to said first shell element via said first web, said second shell element having a second annular ring element and a second web located at a spaced location from said first projection portion and said second projection portion, said second annular ring element having a second longitudinal axis and a second annular ring element inner surface, said second annular ring element inner surface defining a second ring cavity, said second annular ring element being connected to said second shell element via said second web, said first longitudinal axis being aligned with said second longitudinal axis to form a common center line perpendicular to said joining direction, said second ring cavity being in communication with said first ring cavity to define a plug-in element receiving recess, said plug-in element being inserted into said plug-in element receiving recess such that said first annular ring element is connected to said second annular ring element via said plug-in element, said plug-in element engaging said first annular ring element inner surface and said second annular ring element inner surface, said plug-in element, said first annular ring element and said second annular ring element defining a coupling means for coupling said first shell element to said second shell element.

\* \* \* \* \*